United States Patent
Wen

(10) Patent No.: US 9,326,210 B2
(45) Date of Patent: Apr. 26, 2016

(54) BLIND HANDOVER OR BLIND REDIRECTION METHOD AND SYSTEM

(75) Inventor: Yongming Wen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/342,631

(22) PCT Filed: Dec. 14, 2011

(86) PCT No.: PCT/CN2011/083963
§ 371 (c)(1),
(2), (4) Date: Mar. 4, 2014

(87) PCT Pub. No.: WO2012/151991
PCT Pub. Date: Nov. 15, 2012

(65) Prior Publication Data
US 2014/0228029 A1 Aug. 14, 2014

(30) Foreign Application Priority Data
Sep. 9, 2011 (CN) .......................... 2011 1 0267067

(51) Int. Cl.
*H04W 36/00* (2009.01)
*H04W 36/24* (2009.01)

(52) U.S. Cl.
CPC .................. *H04W 36/245* (2013.01)

(58) Field of Classification Search
CPC ........................... H04W 36/00; H04W 36/165
USPC ........................................... 455/436; 370/338
See application file for complete search history.

(56) References Cited

U.S. PATENT DOCUMENTS 6,393,282 B1 5/2002 Iimori
7,505,446 B2 3/2009 Pecen
(Continued)

FOREIGN PATENT DOCUMENTS

CN 101300863 A 11/2008
CN 101895949 A 11/2010
(Continued)

OTHER PUBLICATIONS

International Search Report in international application No. PCT/CN2011/083963, mailed on May 17, 2012. (2 pages—see entire document).

(Continued)

*Primary Examiner* — Marcos Batista
(74) *Attorney, Agent, or Firm* — Oppedahl Patent Law Firm LLC

(57) ABSTRACT

A blind handover or blind redirection method and system are provided. The method includes: when a UE needs to perform blind handover or blind redirection, it is determined whether there is a history record of handover or redirection of the UE; and when there is the history record, a target cell which the UE is about to be blindly handed over to or blindly redirected to is selected according to the history record. In the disclosure, when a UE needs to perform blind handover or blind redirection, a base station selects a target cell through a stored history record of handover or redirection that the UE performed previously, so that the accuracy of target cell selection is improved, the success rate of blind handover or blind redirection is increased, and repeated processes of performing blind handover or blind redirection are reduced, thereby saving network resources, and meanwhile the occurrence probability of a call drop event is reduced, thereby improving user experience.

8 Claims, 4 Drawing Sheets

(56) References Cited

U.S. PATENT DOCUMENTS

| | | | |
|---|---|---|---|
| 8,005,058 B2 | 8/2011 | Pecen | |
| 8,140,076 B2 * | 3/2012 | Ponce de Leon | H04W 36/30 370/328 |
| 2002/0119779 A1 | 8/2002 | Ishikawa | |
| 2004/0121770 A1 * | 6/2004 | Tigerstedt | H04W 36/0083 455/436 |
| 2004/0185851 A1 | 9/2004 | Nagai | |
| 2007/0165583 A1 | 7/2007 | Pecen | |
| 2009/0135798 A1 | 5/2009 | Pecen | |
| 2009/0262654 A1 | 10/2009 | Iwamura et al. | |
| 2011/0177819 A1 * | 7/2011 | Kitahara | H04W 36/245 455/436 |
| 2011/0300869 A1 | 12/2011 | Iwamura et al. | |
| 2013/0231116 A1 * | 9/2013 | Mildh | H04W 36/0005 455/436 |

FOREIGN PATENT DOCUMENTS

| | | |
|---|---|---|
| CN | 102088718 A | 6/2011 |
| EP | 1061752 A1 | 12/2000 |
| EP | 1229754 A1 | 8/2002 |
| EP | 1460874 A2 | 9/2004 |
| EP | 2355582 A1 | 8/2011 |
| WO | 2007082368 A1 | 7/2007 |

OTHER PUBLICATIONS

English Translation of the Written Opinion of the International Search Authority in international application No. PCT/CN2011/083963, mailed on May 17, 2012. (7 pages—see entire document).

Supplementary European Search Report in European application No. 11864941.7, mailed on Apr. 28, 2015.

* cited by examiner

BLIND HANDOVER OR BLIND REDIRECTION METHOD AND SYSTEM

TECHNICAL FIELD

The disclosure relates to the field of wireless communication technology, and more particularly to a blind handover or blind redirection method and system.

BACKGROUND

Generally, a cellular network topology is applied in a modern wireless communication network. There are many other adjacent cells around a cell covered by a base station, while only one or more cells generally are applicable to serve as a target cell for handover or redirection of a User Equipment (UE). In addition, handover or redirection is controlled by the base station of the network side, which requires the base station to make a right choice among these adjacent cells. Generally, when handover or redirection is performed, the UE needs to firstly report signal qualities of adjacent cells to the base station, and the base station then selects an appropriate target cell according to a reporting result of the UE, a network load and other information so that handover or redirection is performed by the UE. In this way, an optimal cell is selected through handover or redirection, thus ensuring the success rate of handover or redirection.

However, when handover or redirection is performed, a wireless link is established between the UE and the base station. In other words, both a receiver and a transmitter of the UE are working. Due to the influence of cost, complexity, portability and other factors, the UE is generally provided with a set of receiver and transmitter, thus the UE has difficulty in measuring the signal qualities of other adjacent cells and can hardly use the working receiver to measure other cells. During data reception and transmission, it is even more difficult for the UE to change a working frequency or system to measure other adjacent cells especially those with different frequencies and systems.

In order to enable the UE to measure other cells during data reception and transmission, it is agreed with the UE in advance in some standards that the UE will measure other cells without receiving and transmitting data within a certain period of time. For example, a measurement interval mechanism is specified in a Long Term Evolution (LTE) standard, and the measurement interval mechanism includes: a measurement interval of 8 ms is allocated to the UE every 40 ms. Both the UE and the base station do not receive and transmit data within the measurement interval so that the UE can measure an adjacent cell. However, this is at the cost of sacrificing data transmission performance. For example, a decrease of 20% in data throughput may be caused at most according to the LTE standard.

It is also time-consuming if the UE needs to measure signals of an adjacent cell within a certain period of time and report the signals of the adjacent cell to the base station and the base station then selects a target cell according to a measurement result. Usage experience of a user may be also affected due to non-timely handover or redirection, especially when the UE needs to perform handover or redirection immediately on occasions including a high speed motion and the like.

Due to the influence of the factors above, not only optimized handover or redirection with measurement is applied, but also blind handover or redirection is widely applied in modern wireless communication networks at present. Blind handover or redirection refers to that a base station directly orders a UE to switch or redirect to a certain target cell without requiring the UE to measure an adjacent cell and to report a measurement result. However, an inappropriate target cell may be selected by blind handover or redirection of the base station after all without a measuring result as a selection basis, which results in a failure and influences user experience. If unsuccessful handover or redirection is repeated for many times, network resources may be further consumed.

SUMMARY

In view of this, the disclosure is intended to provide a blind handover or blind redirection method, which can increase the probability for a base station to blindly switch or redirect a UE to an appropriate target cell.

To this end, a technical solution of the disclosure is implemented as follows.

A blind handover or blind redirection method includes:

when a UE needs to perform blind handover or blind redirection, it is determined whether there is a history record of handover or redirection of the UE; and when there is the history record, a target cell which the UE is about to be blindly handed over to or blindly redirected to is selected according to the history record.

Preferably, the method may further include:

after the UE is successfully handed over to or redirected to the target cell, the history record of the handover or redirection of the UE is updated.

The process that the history record of the handover or redirection of the UE is updated may include:

it is determined whether there is the history record of the UE; if there is the history record of the UE, it is further determined whether the target cell of the successful handover or redirection has been recorded;

when the target cell has been recorded, the number of times of successful handover or redirection corresponding to the target cell is increased by one, and the moment the handover or redirection occurs is recorded; and when there is no history record of the UE or the target cell has not been recorded, a piece of record of the target cell is added, the number of times of successful handover or redirection corresponding to the target cell is set as one, and the moment the handover or redirection occurs is recorded.

Preferably, the method may further include:

when there is no history record, a target cell is selected according to a conventional blind handover or blind redirection method.

The process that the target cell which the UE is about to be blindly handed over to or blindly redirected to is selected according to the history record may include:

the target cell which the UE is about to be blindly handed over to or blindly redirected to is selected according to the number of times of successful handover or redirection and a time factor corresponding to each target cell in the history record.

A blind handover or blind redirection system includes: a base station and a database, wherein the base station is configured to: when a UE needs to perform blind handover or blind redirection, determine whether there is a history record of handover or redirection of the UE in the database; and when there is the history record in the database, select, according to the history record, a target cell which the UE is about to be blindly handed over to or blindly redirected to, The base station may be further configured to, after the UE is successfully handed over to or redirected to the target cell, update the history record of the handover or redirection of the UE.

The base station may be specifically configured to: determine whether there is the history record of the UE; if there is the history record of the UE, further determine whether the target cell of the successful handover or redirection has been recorded; when the target cell has been recorded, increase the number of times of successful handover or redirection corresponding to the target cell by one, and record the moment the handover or redirection occurs; and when there is no history record of the UE or the target cell has not been recorded, add a piece of record of the target cell, set the number of times of successful handover or redirection corresponding to the target cell as one, and record the moment the handover or redirection occurs.

Preferably, the base station may be further configured to, when there is no history record, select a target cell according to a conventional blind handover or blind redirection method.

The base station may be specifically configured to select, according to the number of times of successful handover or redirection and a time factor corresponding to each target cell in the history record, the target cell which the UE is about to be blindly handed over to or blindly redirected to.

In the disclosure, when a UE needs to perform blind handover or blind redirection, a base station selects a target cell according to a stored history record of handover or redirection performed by the UE previously, so that the accuracy of target cell selection is improved. Thus, the success rate of blind handover or blind redirection is increased, and repeated processes of performing blind handover or blind redirection are reduced, thereby saving network resources, and meanwhile the occurrence probability of a call drop event is reduced, thereby improving user experience.

DETAILED DESCRIPTION

Figure 1:
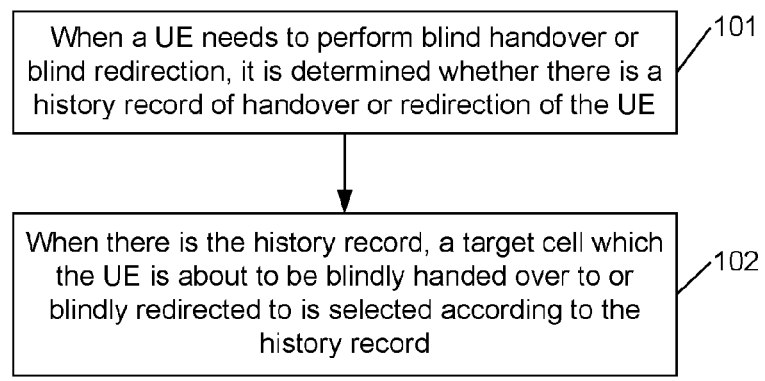
FIG. 1 is a flowchart illustrating implementation of a blind handover or blind redirection method of the disclosure.

The basic idea of the disclosure is: when a UE needs to perform blind handover or blind redirection, it is determined whether there is a history record of handover or redirection of the UE; and when there is the history record, a target cell which the UE is about to be blindly handed over to or blindly redirected to is selected according to the history record.

Generally, wireless communication networks are less likely to be upgraded massively or re-planned after being established. Therefore, the structures of the networks are relatively fixed, and base station locations and cell parameters of the networks will be not changed generally and adjacent cells among the networks are also relatively fixed.

Usually, people move with certain regularity in places including cities, suburbs and the like. For example, people usually tend, along fixed routes, to go to relatively familiar places or places that they used to go frequently. Although sometimes people may also change their routes or go to places where they have never been to, this is relatively rare. For example, urban office workers go to companies along fixed routes every morning, and go home from companies along fixed routes again in the evening. Usually, there are also fixed destinations and middle routes for people to go to places for leisure and shopping. For example, people go to a recreation square or a shopping plaza along fixed routes in the morning on weekends and return home in the evening.

In a geographical range covered by a certain cell, different users move along different routes, thus these UEs are handed over or redirected to different target cells. However, a specific user moves along a substantially-fixed route during each handover or redirection within a specific period of time. For example, an urban office worker goes to company from home along a fixed route every morning and the direction of handover or redirection of a UE carried by the urban office worker is assumed to be . . . Cell A→Cell B→Cell C . . . , then the urban office worker goes home from company along an opposite route, and the direction of handover or redirection of the carried UE may be probably . . . Cell C→Cell B→Cell A . . . . For Cell B, a target cell for handover and redirection of the UE may be probably Cell C in a period of time around 8 or 9 am, and a target cell for handover and redirection of the UE may be probably Cell A in a period of time around 5 or 6 pm.

A relatively fixed network structure, relatively fixed moving routes of people, and close correlation with time mean that, reflected as the mobility of a wireless communication network, there are generally several specific targets cells applicable to a certain UE and varying in different periods of time when handover or redirection is performed in a certain cell.

To make the purposes, technical solutions and advantages of the disclosure clearer and easy to understand, the disclosure will be further elaborated below by illustrating embodiments and with reference to the accompanying drawings.

FIG. 1 shows a flowchart illustrating implementation of a blind handover or blind redirection method of the disclosure. As shown in FIG. 1, the method includes the following steps:

Step 101: When a UE needs to perform blind handover or blind redirection, it is determined whether there is a history record of handover or redirection of the UE.

Specifically, the history record of the handover or redirection of the UE includes a target cell of each previous successful handover or redirection of the UE, the number of times of successful handover or redirection corresponding to the target cell and the moment each successful handover or redirection occurs.

When the UE needs to perform blind handover or blind redirection due to moving or other reasons, a base station determines whether a history record of a previous successful handover or redirection of the UE is stored in a database. If the history record of the previous successful handover or redirection of the UE is stored in a database, Step 102 is executed; otherwise, a target cell is selected according to an existing conventional blind handover or blind redirection method.

Step 102: When there is the history record, a target cell which the UE is about to be blindly handed over to or blindly redirected to is selected according to the history record.

Specifically, the target cell of the blind handover or blind redirection of the UE is selected according to the number of times of successful handover or redirection and a time factor corresponding to each target cell in history records. The number of times of successful handover or redirection and the time factor need to be considered comprehensively. Specifically, weighted accumulation may be performed, with a time difference, on the number of times of successful handover or redirection corresponding to all target cells in history, and a cell with the largest accumulative sum may be selected. For example, in history, a certain UE hands over to Cell C for 8 times from 8:00 to 9:00 am in a certain cell, hands over to Cell A for 6 times from 5:00 pm to 6:00 pm, and hands over to Cell D once on 10:00 pm. If the UE performs blind handover or blind redirection on 5:30 pm currently, Cell A is selected as the target cell.

The step may further include: after the UE performs the handover or redirection to the target cell successfully, the history record of the handover or redirection of the UE is updated. Specifically, it is determined whether there is the history record of the UE; if there is the history record of the UE, it is further determined whether the target cell of the successful handover or redirection has been recorded. When the target cell has been recorded, the number of times of successful handover or redirection corresponding to the target cell is increased by one, and the moment the handover or redirection occurs is recorded. When there is no history record of the UE or the target cell has not been recorded, a piece of record of the target cell is added, the number of times of successful handover or redirection corresponding to the target cell is set as one, and the moment the handover or redirection occurs is recorded.

Figure 2:
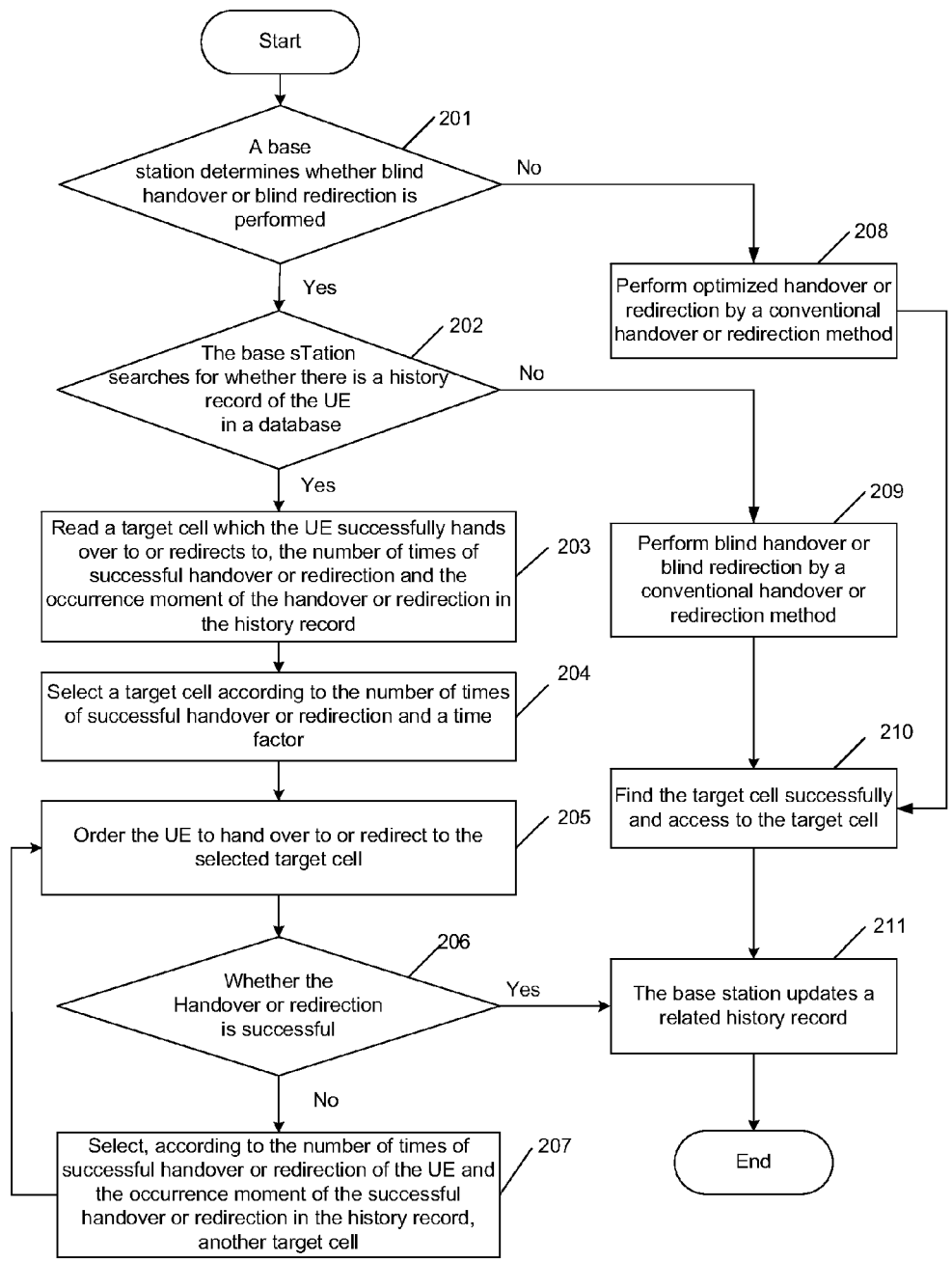
FIG. 2 is a flowchart illustrating implementation of the first embodiment of a blind handover or blind redirection method of the disclosure.

FIG. 2 shows a flowchart illustrating implementation of the first embodiment of a blind handover or blind redirection method of the disclosure. As shown in FIG. 2, the first embodiment includes the following steps:

Step 201: When a UE needs to perform handover or redirection, a base station determines whether the blind handover or blind redirection is performed. If the blind handover or blind redirection is performed, Step 202 is executed; otherwise, Step 208 is executed.

Specifically, when the UE does not report a measurement result to the base station and the UE needs to perform the handover or redirection, the base station determines that the UE needs to perform the blind handover or blind redirection.

Step 202: The base station searches for whether there is a history record of the UE in a database. If there is a history record of the UE in the database, Step 203 is executed; otherwise, Step 209 is executed.

Step 203: A target cell which the UE successfully hands over to or redirects to, the number of times of successful handover or redirection and the occurrence moment of the handover or redirection in the history record are read.

Step 204: The base station selects, according to the number of times of successful handover or redirection of the UE and a time factor in the history record, a target cell which the UE is about to be blindly handed over to or blindly redirected to.

Step 205: The base station orders the UE to hand over to or redirect to the selected target cell.

Step 206: The base station determines whether the UE successfully hands over to or redirects to the selected target cell. If the UE successfully hands over to or redirects to the selected target cell, Step 211 is executed; otherwise, Step 207 is executed.

Step 207: The base station reselects, according to the number of times of successful handover or redirection corresponding to other target cells and the occurrence moment of handover or redirection corresponding to other target cells in the history record, a target cell which the UE is about to be handed over to or redirected to, and then Step 205 is executed.

Step 208: The base station controls, by a conventional handover or redirection method, the UE according to a measurement result reported by the UE to perform optimized handover or redirection; and Step 210 is executed.

Step 209: When a history record of handover or redirection of the UE is not stored in the database, it is indicated that the UE performs handover or redirection for the first time, and the base station controls, by a conventional handover or redirection method, the UE to perform the blind handover or blind redirection; and Step 210 is executed.

Step 210: The base station controls the UE to successfully find the target cell and to access the target cell; and Step 211 is executed.

Step 211: The base station updates a related history record; and the current processing flow is ended.

Specifically, when a history record of the UE is not stored in the database, a history record of the UE is added, the target cell which the UE successfully hands over to or redirects to and the occurrence moment of the successful handover or redirection are recorded, and the number of times of successful handover or redirection corresponding to the target cell is set as one. When a history record of the UE is stored in the database, it is further determined whether the target cell of the successful handover or redirection is recorded in the history record. If the target cell of the successful handover or redirection is recorded in the history record, the number of times of successful handover or redirection corresponding to the target cell is increased by one and the occurrence moment the successful handover or redirection is recorded; otherwise, the target cell is added to the history record, the number of times of successful handover or redirection is set as one and the occurrence moment of the successful handover or redirection is recorded.

Figure 3:
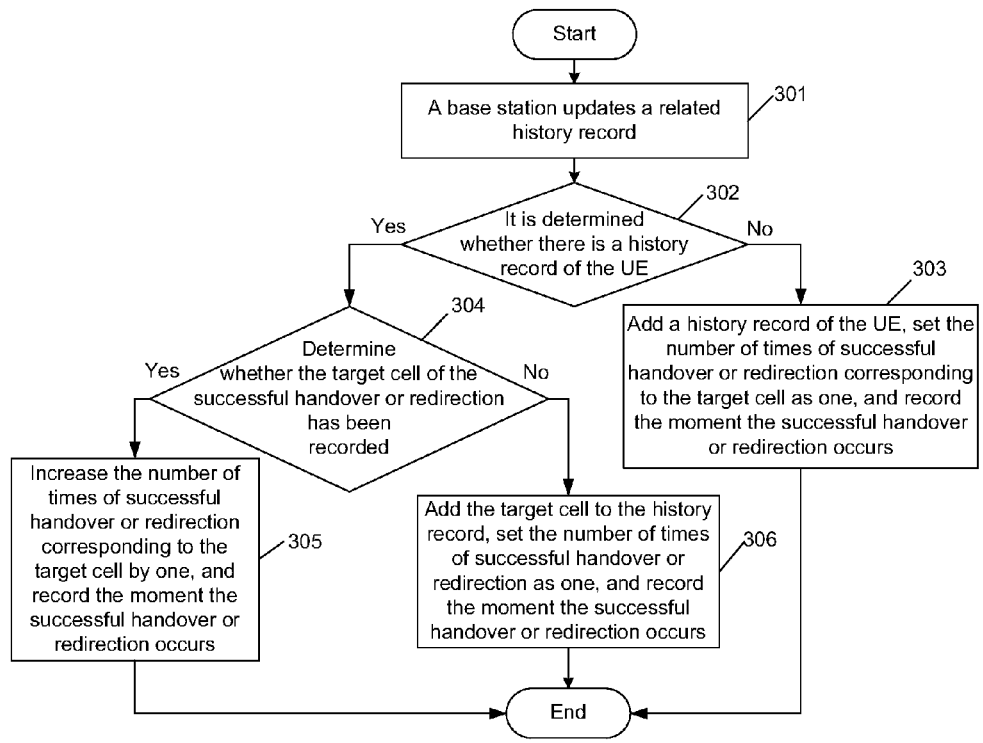
FIG. 3 is a flowchart illustrating implementation of the second embodiment of a blind handover or blind redirection method of the disclosure.

FIG. 3 shows a flowchart illustrating implementation of the second embodiment of a blind handover or blind redirection method of the disclosure. As shown in FIG. 3, the second embodiment is specifically a process in which a base station updates a history record, including the following steps:

Step 301: When a UE performs handover or redirection successfully, the base station updates a related history record.

Specifically, in the step, after the UE performs handover or redirection successfully by an optimized handover or redirection method with measurement, or by a traditional blind handover or redirection method, or by the blind handover or blind redirection method provided by the disclosure, the base station has to update the related history record.

Step 302: The base station determines whether there is a history record of the UE. If there is no history record of the UE, Step 303 is executed; otherwise, Step 304 is executed.

Step 303: The base station adds a history record of the UE, sets the number of times of successful handover or redirection corresponding to the target cell as one, and records the occurrence moment of the successful handover or redirection; and the current processing flow is ended.

In the present embodiment, the history record of the UE includes a target cell which the UE successfully hands over to or redirects to, the number of times of successful handover or redirection corresponding to the target cells and the occurrence moment of each successful handover or redirection.

Step 304: The base station further determines whether the target cell of the successful handover or redirection has been recorded. If the target cell of the successful handover or redirection has been recorded, Step 305 is executed; otherwise, Step 306 is executed.

Step 305: The base station increases the number of times of successful handover or redirection corresponding to the target cell by one, and records the occurrence moment of the successful handover or redirection; and the current processing flow is ended.

Step 306: The base station adds the target cell to the history record, sets the number of times of successful handover or redirection corresponding to the target cell as one, and records the occurrence moment of the successful handover or redirection; and the current processing flow is ended.

Figure 4:
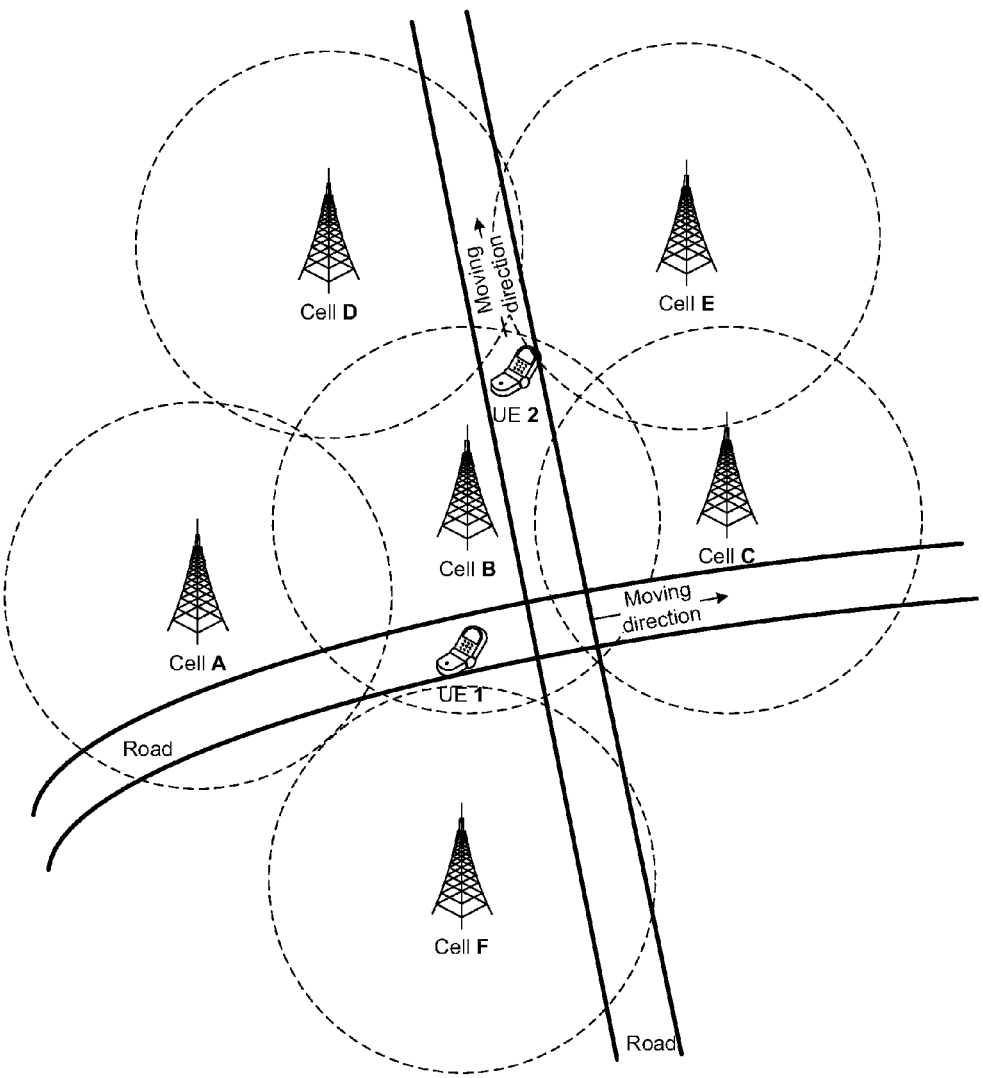
FIG. 4 is a schematic diagram illustrating a scenario in which a UE performs blind handover or blind redirection.

FIG. 4 shows a schematic diagram illustrating a scenario in which a UE performs blind handover or blind redirection. As shown in FIG. 4, Cell B covers a crossroad, around which adjacent cells including Cells A, C, D, E, F and the like are located, and the coverage of each cell is represented by a dashed circle. UE 1 moves towards Cell C along a road on an edge of the coverage of Cell B, and UE 2 moves towards Cell D and Cell E along a road on an edge of the coverage of Cell B.

It is assumed that a history record of UE 1, which is stored in a base station which is located in Cell B, indicates that, specifically referring to Table 1, UE 1 used to hand over to or redirect to Cell A, Cell C and Cell D in history. The number of times of successful handover or redirection corresponding to these three cells and the occurrence moment of each successful handover or redirection are as shown in Table 1.

TABLE 1

| Cell identifier | Number of times of successful handover or redirection | Moment |
| --- | --- | --- |
| Cell A | 6 | 17:05, 17:13, 17:28, 17:33, 17:48, 17:51 |
| Cell C | 8 | 8:05, 8:13, 8:28, 8:33, 8:48, 8:51, 8:55, 8:56 |
| Cell D | 1 | 10:20 |

It is assumed that a history record of UE 2, which is stored in the base station which is located in Cell B, indicates that, specifically referring to Table 2, UE 2 used to perform hand over to or redirect to Cell D, Cell E and Cell F in history. The number of times of successful handover or redirection corresponding to these three cells and the occurrence moment of each successful handover or redirection are as shown in Table 2.

TABLE 2

| Cell identifier | Number of times of successful handover or redirection | Moment |
| --- | --- | --- |
| Cell D | 5 | 8:05, 8:13, 8:28, 8:33, 8:48 |
| Cell E | 1 | 8:51 |
| Cell F | 8 | 17:05, 17:13, 17:28, 17:33, 17:48, 17:51, 17:55, 17:56 |

It is assumed that the base station which is located in Cell B needs to perform blind handover on UE 1 and UE 2 on 8:30 in the morning one day. Then, Target Cell C is selected for UE 1 and Target Cell D is selected for UE 2 according to the history record lists, specifically referring to Table 1 and Table 2 of UE 1 and UE 2 and in combination with judgment of the current time.

After the blind handover is completed successfully, the base station which is located in Cell B further needs to update history records of UE 1 and UE 2, and the updated history records are as shown in Table 3 and Table 4 respectively.

TABLE 3

| Cell identifier | Number of times of successful handover or redirection | Moment |
| --- | --- | --- |
| Cell A | 6 | 17:05, 17:13, 17:28, 17:33, 17:48, 17:51 |
| Cell C | 9 | 8:05, 8:13, 8:28, 8:30, 8:33, 8:48, 8:51, 8:55, 8:56 |
| Cell D | 1 | 10:20 |

TABLE 4

| Cell identifier | Number of times of successful handover or redirection | Moment |
| --- | --- | --- |
| Cell D | 6 | 8:05, 8:13, 8:28, 8:30, 8:33, 8:48 |
| Cell E | 1 | 8:51 |
| Cell F | 8 | 17:05, 17:13, 17:28, 17:33, 17:48, 17:51, 17:55, 17:56 |

Figure 5:
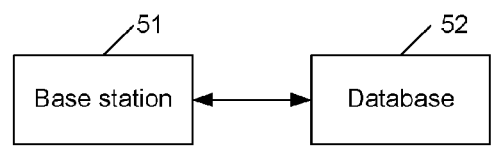
FIG. 5 is a structural diagram of a blind handover or blind redirection system of the disclosure.

FIG. 5 shows a structure of a blind handover or blind redirection system of the disclosure. As shown in FIG. 5, the system includes: a base station 51 and a database 52.

The base station 51 is configured to: when a UE needs to perform blind handover or blind redirection, determine whether there is a history record of handover or redirection of the UE in the database 52; and when there is the history record in the database 52, select, according to the history record, a target cell which the UE is about to be blindly handed over to or blindly redirected to. The history record of handover or redirection of the UE includes a target cell of each previous successful handover or redirection, the number of times of successful handover or redirection corresponding to the target cell, and the moment of each successful handover or redirection occurs.

Further, the base station 51 is further configured to, after the UE successfully hands over to or redirects to the target cell, update the history record of the handover or redirection of the UE.

The base station 51 is specifically configured to: determine whether there is the history record of the UE; if there is the history record of the UE, further determine whether the target cell of the successful handover or redirection has been recorded; when the target cell of the successful handover or redirection has been recorded, increase the number of times of successful handover or redirection corresponding to the target cell by one, and record the moment the handover or redirection occurs; and when there is no history record of the UE or the target cell has not been recorded, add a piece of record of the target cell, set the number of times of successful handover or redirection corresponding to the target cell as one, and record the moment the handover or redirection occurs.

Further, the base station 51 is further configured to, when there is no history record, select a target cell according to a conventional blind handover or blind redirection method.

The base station 51 is specifically configured to select, according to the number of times of successful handover or redirection and a time factor corresponding to each target cell in the history record, the target cell which the UE is about to be blindly handed over to or blindly redirected to. The target cell needs to be selected by considering the number of times of successful handover or redirection and the time factor comprehensively. Specifically, weighted accumulation may be performed, with a time difference, on the number of times of successful handover or redirection corresponding to all target cells in history, and a cell with the largest accumulative sum may be selected.

The above are merely preferred embodiments of the disclosure, and are not intended to limit the scope of protection of the claims of the disclosure.

The invention claimed is:

1. A blind handover or blind redirection method, comprising:
   when a User Equipment (UE) needs to perform blind handover or blind redirection, determining, by a base station, whether there is a history record of handover or redirection of the UE; and
   when there is the history record, selecting, by the base station according to the history record, a target cell which the UE is about to be blindly handed over to or blindly redirected to;
   wherein the history record includes: a target cell of each previous successful handover or redirection of the UE, the number of times of successful handover or redirection corresponding to the target cell and the moment each successful handover or redirection occurs;
   wherein the step of selecting, by the base station according to the history record, the target cell which the UE is about to be blindly handed over to or blindly redirected to comprises:
   according to the number of times of successful handover or redirection and a time factor corresponding to each target cell in the history record, performing a weighted accumulation with a time difference on the number of times of successful handover or redirection, and then selecting a target cell with the largest accumulative sum as the target cell which the UE is about to be blindly handed over to or blindly redirected to.

2. The method according to claim 1, further comprising:
   after the UE is successfully handed over to or redirected to the target cell, updating, by the base station, the history record of the handover or redirection of the UE.

3. The method according to claim 2, wherein the step of updating, by the base station, the history record of the handover or redirection of the UE comprises:
   determining whether there is the history record of the UE;
   if there is the history record of the UE, further determining whether the target cell of the successful handover or redirection has been recorded;
   when the target cell has been recorded, increasing the number of times of successful handover or redirection corresponding to the target cell by one, and recording the moment the handover or redirection occurs; and
   when there is no history record of the UE or the target cell has not been recorded, adding a piece of record of the target cell, setting the number of times of successful handover or redirection corresponding to the target cell as one, and recording the moment the handover or redirection occurs.

4. The method according to claim 1, further comprising:
   when there is no history record, selecting, by the base station, a target cell according to a conventional blind handover or blind redirection method.

5. A blind handover or blind redirection system, comprising:
   a base station and a database, wherein the base station is configured to: when a User Equipment (UE) needs to perform blind handover or blind redirection, determine whether there is a history record of handover or redirection of the UE in the database; and when there is the history record in the database, select, according to the history record, a target cell which the UE is about to be blindly handed over to or blindly redirected to;
   wherein the history record includes: a target cell of each previous successful handover or redirection of the UE, the number of times of successful handover or redirection corresponding to the target cell and the moment each successful handover or redirection occurs;
   the base station is further configured to: according to the number of times of successful handover or redirection and a time factor corresponding to each target cell in the history record, perform a weighted accumulation with a time difference on the number of times of successful handover or redirection, and then select a target cell with the largest accumulative sum as the target cell which the UE is about to be blindly handed over to or blindly redirected to.

6. The system according to claim 5, wherein the base station is further configured to, after the UE successfully hands over to or redirects to the target cell, update the history record of the handover or redirection of the UE.

7. The system according to claim 6, wherein the base station is configured to: determine whether there is the history record of the UE; if there is the history record of the UE, further determine whether the target cell of the successful handover or redirection has been recorded; when the target cell has been recorded, increase the number of times of successful handover or redirection corresponding to the target cell by one, and record the moment the handover or redirection occurs; and when there is no history record of the UE or the target cell has not been recorded, add a piece of record of the target cell, set the number of times of successful handover or redirection corresponding to the target cell as one, and record the moment the handover or redirection occurs.

8. The system according to claim 5, wherein the base station is further configured to, when there is no history record, select a target cell according to a conventional blind handover or blind redirection method.

* * * * *